US012618530B2

(12) United States Patent
Komatsu

(10) Patent No.: US 12,618,530 B2
(45) Date of Patent: May 5, 2026

(54) TRIPLE-SHELL TANK

(71) Applicant: KAWASAKI JUKOGYO KABUSHIKI KAISHA, Kobe (JP)

(72) Inventor: Takanori Komatsu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 53 days.

(21) Appl. No.: 18/724,117

(22) PCT Filed: Dec. 20, 2022

(86) PCT No.: PCT/JP2022/046946
§ 371 (c)(1),
(2) Date: Jun. 25, 2024

(87) PCT Pub. No.: WO2023/127606
PCT Pub. Date: Jul. 6, 2023

(65) Prior Publication Data

US 2025/0060077 A1 Feb. 20, 2025

(30) Foreign Application Priority Data

Dec. 27, 2021 (JP) ................................ 2021-212501

(51) Int. Cl.
*F17C 13/08* (2006.01)

(52) U.S. Cl.
CPC .... *F17C 13/081* (2013.01); *F17C 2203/0631* (2013.01); *F17C 2205/0184* (2013.01); *F17C 2223/0153* (2013.01)

(58) Field of Classification Search
CPC ........... F17C 13/081; F17C 2203/0631; F17C 2205/0184; F17C 2223/0153;
(Continued)

(56) References Cited

U.S. PATENT DOCUMENTS

2012/0325821 A1* 12/2012 Mookerjee ................ F17C 3/02
29/890.035

FOREIGN PATENT DOCUMENTS

| | | | | |
|---|---|---|---|---|
| GB | 2124743 A | * | 2/1984 | ............. F17C 3/022 |
| JP | S55-020937 A | | 2/1980 | |
| JP | S60129373 | * | 7/1985 | |

OTHER PUBLICATIONS

English Machine Translation of JP-S60129373 (Year: 1985).*

* cited by examiner

*Primary Examiner* — Laura E. Parker
(74) *Attorney, Agent, or Firm* — Oliff PLC

(57) ABSTRACT

A triple shell tank includes an inner tank, an intermediate tank covering the inner tank, and an outer tank covering the intermediate tank. The inner tank includes an inner tank side plate, an inner tank roof, and an inner tank bottom plate. The intermediate tank includes an intermediate tank side plate, an intermediate tank roof, and an intermediate tank bottom plate. The circular steps of the intermediate tank side plate include a lowermost step formed of an intermediate tank side plate piece for height adjustment having a height corresponding to a height difference between the inner tank bottom plate and the intermediate tank bottom plate, and a second step on the lowermost step formed of an intermediate tank side plate piece arranged at a same height position as an inner tank side plate piece of a lowermost step in the circular steps of the inner tank side plate.

4 Claims, 5 Drawing Sheets

(58) Field of Classification Search
CPC ...... F17C 2201/0109; F17C 2201/0119; F17C 2201/032; F17C 2201/052; F17C 2209/232; F17C 2221/012; F17C 2223/0161; F17C 2260/013; F17C 2270/0136; F17C 3/022; F17C 13/004; F17C 2209/22; F17C 2260/01; E04H 7/06; B65D 88/06
USPC ................ 220/560.1, 560.04, 565; 52/223.3
See application file for complete search history.

TRIPLE-SHELL TANK

TECHNICAL FIELD

The present disclosure relates to a triple shell tank that stores a low temperature liquefied gas.

BACKGROUND ART

A flat-bottomed tank having a multi-shell structure is known as a facility for storing a low temperature liquefied gas. Patent Literature 1 discloses a flat-bottomed tank having a triple shell structure including an inner tank, an intermediate tank, and an outer tank. In construction of the triple shell tank, it is desirable from the viewpoint of shortening the construction period not to sequentially install the inner tank, the intermediate tank, and the outer tank but to construct them in parallel. In this case, construction openings for carrying in and out construction materials and construction equipment and for allowing workers to enter and exit are opened on the side plate of each of the inner tank, the intermediate tank, and the outer tank.

In general, the side plate of each of the inner tank, the intermediate tank, and the outer tank is assembled by stacking a plurality of circular steps formed by arranging side plate pieces in a circular ring shape. The construction opening is opened by temporarily removing one or a plurality of the side plate pieces after the circular step is formed.

The triple shell tank has a structure in which the intermediate tank covers the entire inner tank, and the outer tank covers the entire intermediate tank. A cool layer is interposed between the bottom plates of adjacent tanks, and therefore a height difference occurs between the height positions of the bottom plates of each tank. Therefore, a height difference also occurs at the lowermost height position of the side plate of each tank. Accordingly, when the construction opening is opened on each side plate by removing the side plate piece, a step may occur between adjacent construction openings. This step may interrupt smooth work implementation.

CITATION LIST

Patent Literature

Patent Literature 1: JP S55-20937 A

SUMMARY OF INVENTION

An object of the present disclosure is to provide a structure excellent in workability during construction in a triple shell tank including an inner tank, an intermediate tank, and an outer tank.

A triple shell tank according to one aspect of the present disclosure is a triple shell tank including: an inner tank; an intermediate tank covering the inner tank; and an outer tank covering the intermediate tank, in which the inner tank includes an inner tank side plate assembled by stacking a plurality of circular steps formed by arranging a plurality of inner tank side plate pieces in a circular ring shape, an inner tank roof, and an inner tank bottom plate, the intermediate tank includes an intermediate tank side plate assembled by stacking a plurality of circular steps formed by arranging a plurality of intermediate tank side plate pieces in a circular ring shape, an intermediate tank roof, and an intermediate tank bottom plate, and the circular steps of the intermediate tank side plate include a lowermost step formed of an intermediate tank side plate piece for height adjustment having a height corresponding to a height difference between the inner tank bottom plate and the intermediate tank bottom plate, and a second step on the lowermost step formed of an intermediate tank side plate piece arranged at a same height position as an inner tank side plate piece of a lowermost step in the circular steps of the inner tank side plate.

According to the present disclosure, it is possible to provide a structure excellent in workability during construction in a triple shell tank including an inner tank, an intermediate tank, and an outer tank.

DESCRIPTION OF EMBODIMENTS

Hereinafter, an embodiment of the triple shell tank according to the present disclosure will be described in detail with reference to the drawings. The triple shell tank that is a construction target of the present disclosure is a tank that stores a low temperature liquefied gas, and is a flat-bottomed tank having a ground installation triple shell structure. The liquefied gas to be stored is, for example, liquefied hydrogen or liquid helium.

[Structure of Triple Containment Tank]

Figure 1:
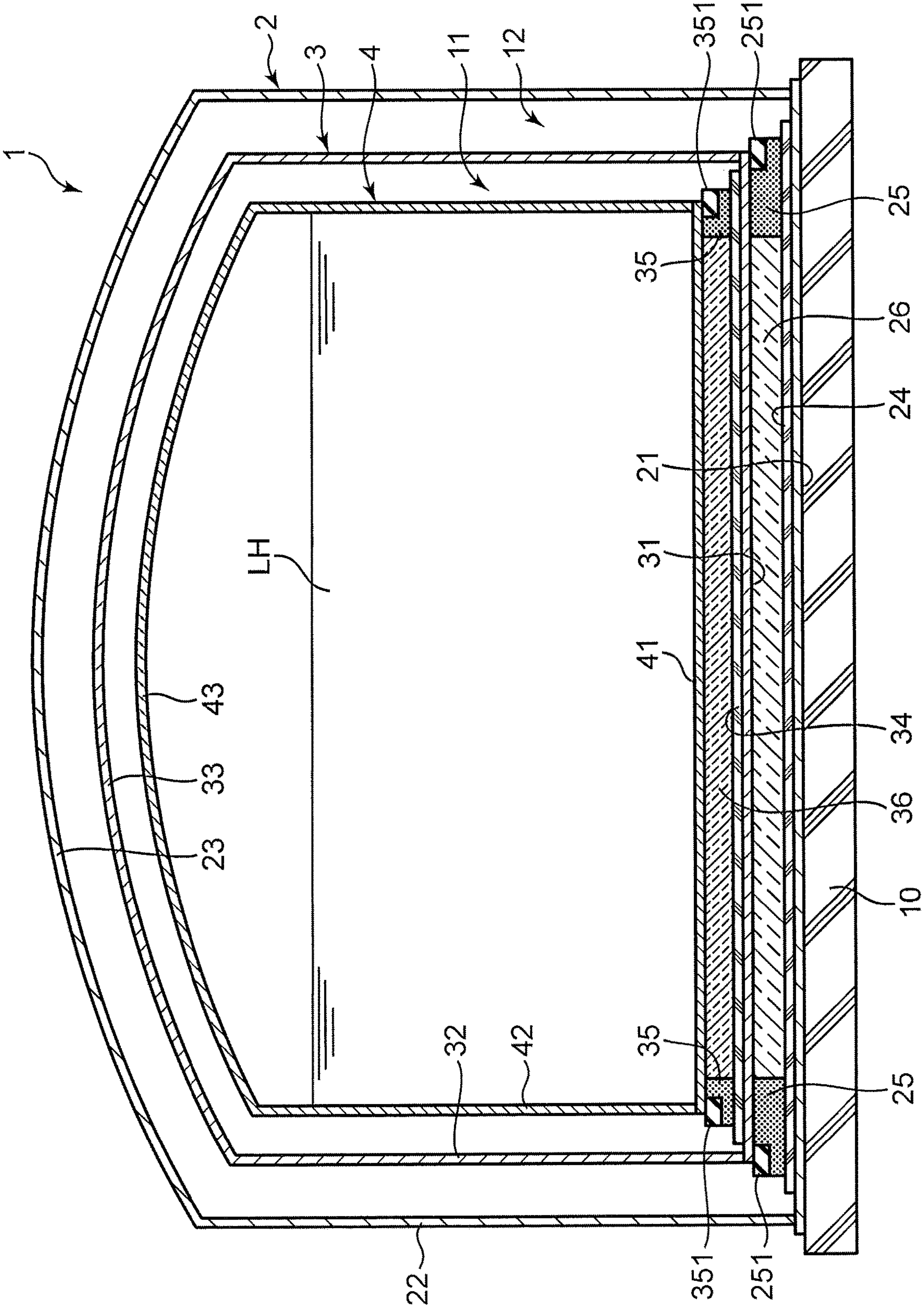
FIG. 1 is a longitudinal cross-sectional view illustrating an example of a triple shell tank of the present disclosure.

The structure of a triple shell tank 1 of the present embodiment will be described based on the longitudinal cross-sectional view illustrated in FIG. 1. FIG. 1 illustrates a triple shell tank 1 that stores liquid hydrogen LH. The triple shell tank 1 includes a tank base 10, an outer tank 2 erected on the tank base 10, an intermediate tank 3 covered with the outer tank 2, and an inner tank 4 covered with the intermediate tank 3. The outer tank 2, the intermediate tank 3, and the inner tank 4 each have a circular shape in top view, and are disposed concentrically.

The tank base 10 is a concrete layer constituting a base portion of the triple shell tank 1. The tank base 10 has a size larger than an outer diameter of the outer tank 2. The outer tank 2 is a sealed body made of metal such as carbon steel, and includes an outer tank bottom plate 21, an outer tank side plate 22, and an outer tank roof 23. The outer tank bottom plate 21 is laid immediately above the tank base 10, and has a disk shape. The outer tank side plate 22 is erected from a peripheral edge of the outer tank bottom plate 21 and has a cylindrical shape. The outer tank roof 23 is attached to the upper end of the outer tank side plate 22 so as to close an upper surface opening of the outer tank side plate 22 having a cylindrical shape, and has a dome shape.

The intermediate tank 3 is a sealed body made of metal such as SUS, and is disposed inside the outer tank 2. The intermediate tank 3 includes an intermediate tank bottom plate 31, an intermediate tank side plate 32, and an intermediate tank roof 33. The intermediate tank bottom plate 31 has a disk shape having a diameter smaller than that of the outer tank bottom plate 21. The intermediate tank side plate 32 is erected from a peripheral edge of the intermediate tank bottom plate 31 and has a cylindrical shape. The intermediate tank roof 33 is attached to the upper end of the intermediate tank side plate 32 and has a dome shape.

A first level concrete layer 24, a first ring portion 25, and an outer bottom portion cool layer 26 are interposed between the outer tank bottom plate 21 and the intermediate tank bottom plate 31. The first level concrete layer 24 is a flattened concrete layer constructed on the outer tank bottom plate 21. The first ring portion 25 is a high-strength concrete layer arranged in a ring shape on the vicinity of the peripheral edge of the first level concrete layer 24. A reinforced concrete layer 251 is disposed at a part of the first ring portion 25 that directly receives a load of the intermediate tank side plate 32. The outer bottom portion cool layer 26 is a layer having a heat insulating property disposed on the first level concrete layer 24 and inside the first ring portion 25. The first ring portion 25 can be formed of an array body of insulating concrete blocks such as perlite concrete blocks. The outer bottom portion cool layer 26 can be formed of an array body of insulating inorganic block materials such as foam glass. For example, a plate material of lightweight aerated concrete may be laid on the outer bottom portion cool layer 26.

The inner tank 4 is a tank that actually stores liquid, is a sealed body made of metal such as SUS, and is disposed inside the intermediate tank 3. The inner tank 4 includes an inner tank bottom plate 41, an inner tank side plate 42, and an inner tank roof 43. The inner tank bottom plate 41 has a disk shape having a diameter smaller than that of the intermediate tank bottom plate 31. The inner tank side plate 42 is erected from a peripheral edge of the inner tank bottom plate 41 and has a cylindrical shape. The inner tank roof 43 is attached to the upper end of the inner tank side plate 42 and has a dome shape. The liquid hydrogen LH is stored inside the inner tank 4.

A second level concrete layer 34, a second ring portion 35, and an inner bottom portion cool layer 36 are interposed between the intermediate tank bottom plate 31 and the inner tank bottom plate 41. The second level concrete layer 34 is constructed on the intermediate tank bottom plate 31. The second ring portion 35 is a high-strength concrete layer arranged in a ring shape on the vicinity of the peripheral edge of the second level concrete layer 34. A reinforced concrete layer 351 is disposed at a part of the second ring portion 35 that directly receives a load of the inner tank side plate 42. The inner bottom portion cool layer 36 is a layer having a heat insulating property disposed on the second level concrete layer 34 and inside the second ring portion 35. For example, the second ring portion 35 can be formed of a perlite concrete block, and the inner bottom portion cool layer 36 can be formed of a foam glass block or the like. For example, a plate material of lightweight aerated concrete may be laid on the inner bottom portion cool layer 36.

A gap having a predetermined width is provided between the inner tank 4 and the intermediate tank 3 and between the intermediate tank 3 and the outer tank 2. A first inter-tank 11, which is a gap between the inner tank 4 and the intermediate tank 3, and a second inter-tank 12, which is a gap between the intermediate tank 3 and the outer tank 2, are filled with a heat insulation material. As the heat insulation material, perlite or glass wool can be used. The first inter-tank 11 is filled with a low-boiling gas equivalent to the liquid hydrogen LH stored in the inner tank 4, for example, hydrogen gas. The second inter-tank 12 is filled with nitrogen gas, for example.

[Details of Side Plate of Each Vessel]

Figure 2:
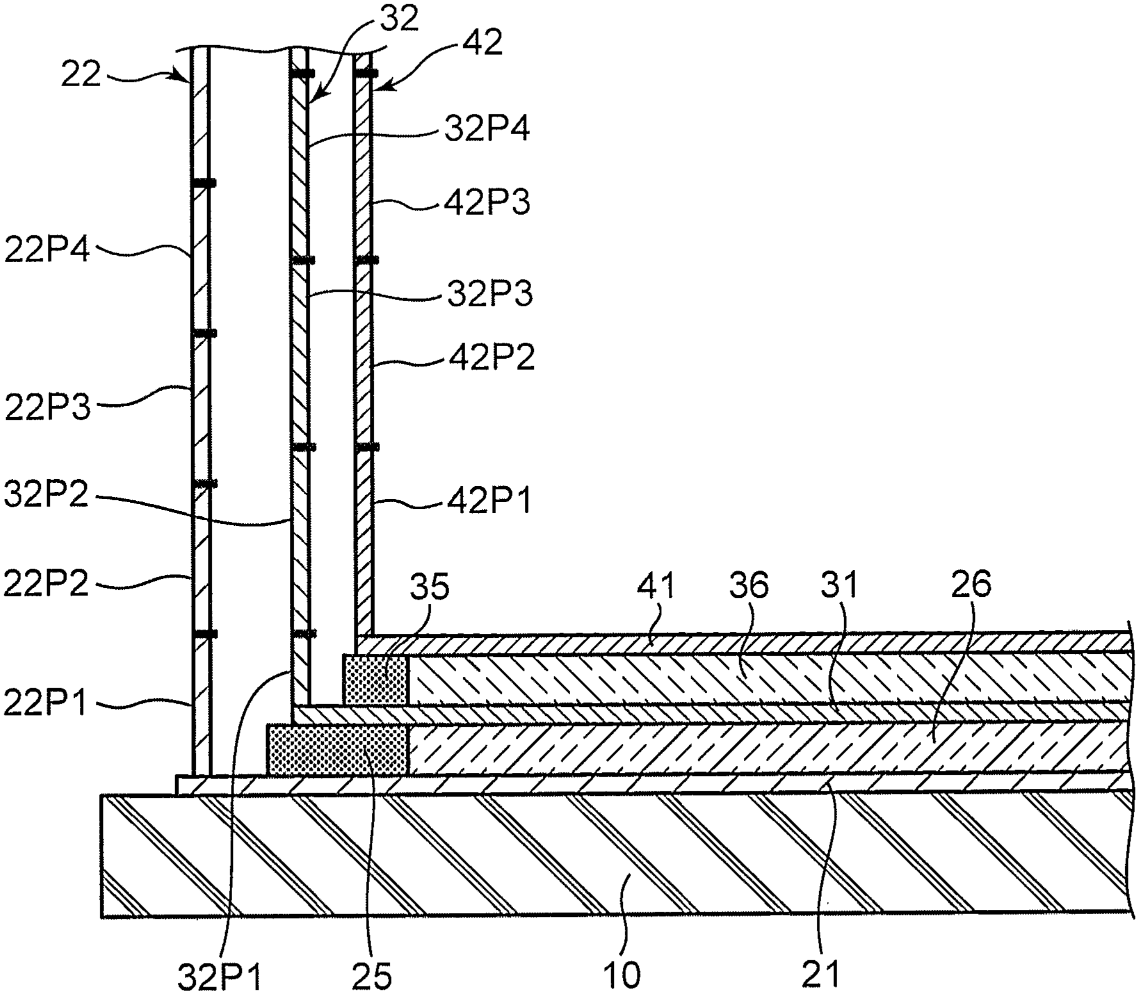
FIG. 2 is a cross-sectional view illustrating details of the vicinity of a lower end of a side plate of each tank of the triple shell tank.
Figure 3:
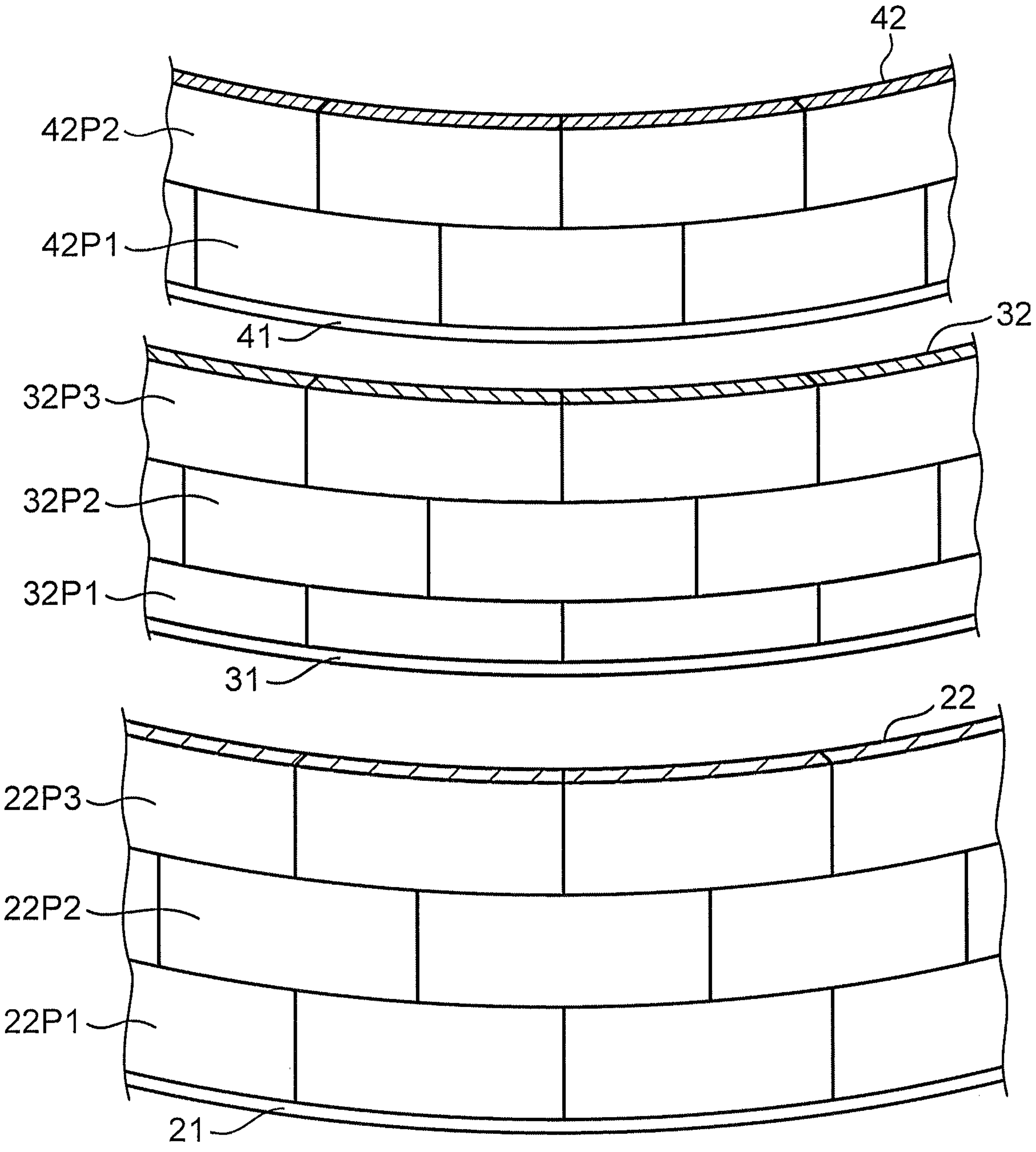
FIG. 3 is an exploded view illustrating a stack state of a circular step formed by a side plate piece for each of an inner tank side plate, an intermediate tank side plate, and an outer tank side plate.

FIG. 2 is a cross-sectional view illustrating details of the vicinity of the lower ends of the outer tank side plate 22, the intermediate tank side plate 32, and the inner tank side plate 42 of the triple shell tank 1. FIG. 3 is an exploded view illustrating a formation state of the side plate of each tank for each of the outer tank side plate 22, the intermediate tank side plate 32, and the inner tank side plate 42. The outer tank side plate 22, the intermediate tank side plate 32, and the inner tank side plate 42 are assembled by stacking a plurality of circular steps formed by arranging a plurality of side plate pieces 22P, 32P, and 42P, respectively, in a circular ring shape. FIGS. 2 and 3 illustrate examples of stacking of the circular steps.

The inner tank side plate 42 is assembled by using the plurality of inner tank side plate pieces 42P formed of a rectangular plate gently curved in an arc shape. Specifically, the plurality of inner tank side plate pieces 42P are arranged in a circular ring shape, and adjacent side plate pieces 42P are welded to form one circular step. By stacking a plurality of such circular steps, the inner tank side plate 42 is installed.

An inner tank side plate piece 42P1 illustrated in FIGS. 2 and 3 is a side plate piece erected immediately above the vicinity of the outer peripheral edge of the inner tank bottom plate 41 and constituting the lowermost circular step of the inner tank side plate 42. An inner tank side plate piece 42P2 is a side plate piece constituting the second circular step stacked on the lowermost step. Between the lowermost circular step and the second circular step, that is, the inner tank side plate pieces 42P1 and 42P2 are also welded.

Thereafter, the circular steps above the third step of the inner tank side plate 42 are stacked up to the design height by an inner tank side plate piece 42P3 and those above the upper step thereof. As the inner tank side plate pieces 42P1 to P3, those having identical or approximate size are used. Note that as the side plate piece for height matching and the side plate piece for backfilling of equal division, those having a size different from the regular size may be used.

The intermediate tank side plate 32 and the outer tank side plate 22 are also assembled by stacking a plurality of circular steps formed by arranging a plurality of side plate pieces in a circular ring shape. The lowermost circular step of the intermediate tank side plate 32 is formed by arranging intermediate tank side plate pieces 32P1 in a circular ring shape immediately above the vicinity of the outer peripheral edge of the intermediate tank bottom plate 31. This lowermost circular step is also a side plate piece for height adjustment for aligning the heights of the second circular step of the intermediate tank side plate 32 installed by an intermediate tank side plate piece 32P2 and the lowermost circular step of the inner tank side plate 42 described above.

There is a height difference between the inner tank bottom plate 41 on which the inner tank side plate 42 is erected and the intermediate tank bottom plate 31 on which the intermediate tank side plate 32 is erected. This height difference occurs when the inner bottom portion cool layer 36 or the second level concrete layer 34 not illustrated in FIG. 2 is installed on the intermediate tank bottom plate 31, and the inner tank bottom plate 41 is laid thereon. The intermediate tank side plate piece 32P1 of the lowermost step has a height corresponding to the height difference between the inner tank bottom plate 41 and the intermediate tank bottom plate 31. Note that the height difference and the height size of the intermediate tank side plate piece 32P1 need not strictly coincide with each other. A slight size difference is allowed as long as a significant step does not occur between the upper end surface of the intermediate tank side plate piece 32P1 and the inner tank bottom plate 41 when the opening for construction described later is opened in the inner tank side plate 42 and the intermediate tank side plate 32.

On the lowermost circular step formed of the intermediate tank side plate piece 32P1 for height adjustment, the second, third, . . . circular steps of the intermediate tank side plate 32 formed by the intermediate tank side plate pieces 32P2, 32P3, . . . are stacked. The second circular step (intermediate tank side plate piece 32P2) of the intermediate tank side plate 32 is disposed at the same height position as the lowermost circular step (inner tank side plate piece 42P1) of the inner tank side plate 42. Here, the "same height" includes a range that can be treated as substantially the same height in addition to the totally same height. Accordingly, even if there is a slight difference between the height position of the intermediate tank side plate piece 32P2 and the height position of the inner tank side plate piece 42P1, it falls within the category of the "same height".

The lowermost circular step of the outer tank side plate 22 is formed by arranging outer tank side plate pieces 22P1 in a circular ring shape immediately above the vicinity of the outer peripheral edge of the outer tank bottom plate 21. The height size of the outer tank side plate piece 22P1 can be selected corresponding to the height difference between the outer tank bottom plate 21 and the inner tank bottom plate 41. By arranging outer tank side plate pieces 22P2 in a circular ring shape on the lowermost circular step, the second circular step is formed. The second circular step of the outer tank side plate 22 formed of the outer tank side plate piece 22P2 is positioned at substantially the same height position as the intermediate tank side plate piece 32P2 constituting the second circular step of the intermediate tank side plate 32. Thereafter, the third, fourth, . . . circular steps of the outer tank side plate 22 are stacked by outer tank side plate pieces 22P3, 22P4, . . . .

In the present embodiment, the side plate pieces 22P, 32P, and 42P used for installation of the respective side plates 22, 32, and 42 have rectangular shapes having identical or approximate heights and circumferential width sizes. The sizes of these side plate pieces 22P, 32P, and 42P can be selected in accordance with the size of one piece that can be manufactured. For example, the intermediate tank side plate piece 32P and the inner tank side plate piece 42P made of SUS have the same size, and the outer tank side plate piece 22P made of carbon steel can be set to have a size slightly smaller or larger than the sizes of the side plate pieces 32P and 42P. Of course, the three side plate pieces 22P, 32P, and 42P may have an identical size, or the side plate pieces 32P and 42P may have different sizes.

[Regarding Opening of Construction Opening]

In construction of the triple shell tank 1, the construction period is prolonged if a method of sequentially installing from an inner tank is adopted, such as starting installation of the intermediate tank 3 after completion of the inner tank 4 and installing the outer tank 2 after completion of the intermediate tank 3. On the other hand, if the outer tank 2, the intermediate tank 3, and the inner tank 4 are installed in parallel, work efficiency can be improved such that the scaffold and the crane can be shared in installation of a plurality of tanks, and as a result, it is possible to contribute to shortening of the construction period. In this case, construction openings for carrying in and out construction materials and construction equipment and for allowing workers to enter and exit need to be opened in the outer tank side plate 22, the intermediate tank side plate 32, and the inner tank side plate 42.

Figure 4:
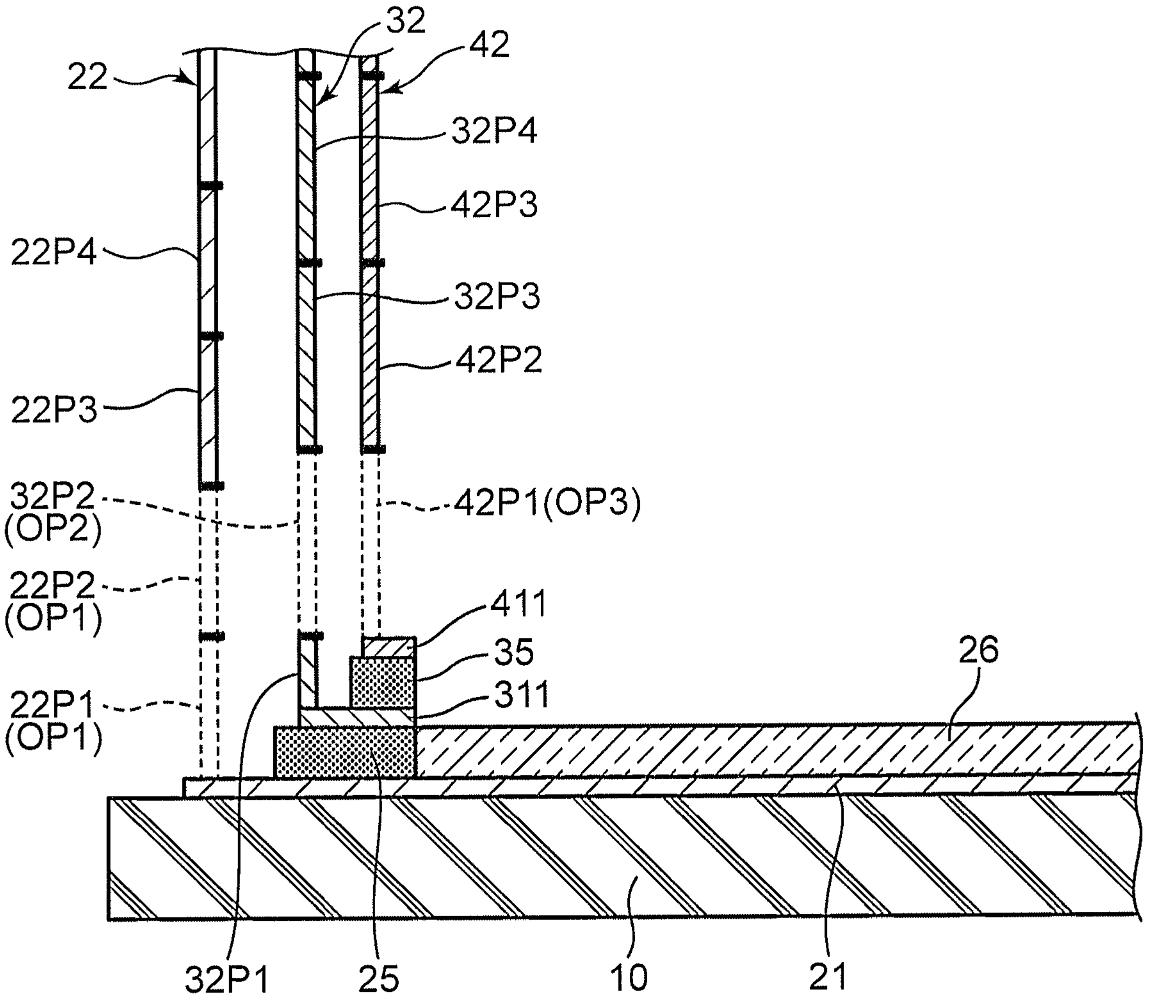
FIG. 4 is a cross-sectional view illustrating an open state of a construction opening of an inner tank side plate, an intermediate tank side plate, and an outer tank side plate.

FIG. 4 is a cross-sectional view illustrating the open state of the construction opening of the inner tank side plate, the intermediate tank side plate, and the outer tank side plate. As construction entrances during construction of the triple shell tank 1, a first opening OP1 is opened when the outer tank side plate 22 is installed, a second opening OP2 is opened when the intermediate tank side plate 32 is installed, and a third opening OP3 is opened when the inner tank side plate 42 is installed. Since these openings OP1, OP2, and OP3 are temporarily opened for construction, they are sealed after being used in order from the inside. That is, the third opening OP3 is sealed after completion of the work inside the inner tank 4, and then the second opening OP2 is sealed after completion of the work inside the intermediate tank 3, and thereafter, the first opening OP1 is sealed after completion of the work inside the outer tank 2. Note that FIG. 4 illustrates an intermediate tank annular 311 and an inner tank annular 411 constituting the vicinity of the outer peripheral edges of the intermediate tank bottom plate 31 and the inner tank bottom plate 41.

The first opening OP1, the second opening OP2, and the third opening OP3 are opened by pulling out one or a plurality of the plurality of side plate pieces 22P, 32P, and 42P constituting the circular steps of the respective side plates 22, 32, and 42. In FIG. 4, the first opening OP1 is opened by pulling out one by one the outer tank side plate pieces 22P1 and 22P2 in the lowermost and second circular steps of the circular steps constituting the outer tank side plate 22. The second opening OP2 is opened by pulling out one of the intermediate tank side plate pieces 32P2 in the second circular step above the lowermost circular step for height adjustment of the circular steps constituting the intermediate tank side plate 32. The third opening OP3 is opened by pulling out one of the inner tank side plate pieces 42P1 in the lowermost circular step of the circular steps constituting the inner tank side plate 42.

These openings OP1, OP2, and OP3 are opened at positions overlapping one another in the circumferential direction of the triple shell tank 1. Since the side plate pieces 22P2, 32P2, and 42P1 existing at substantially the same height position are opened by removal, the heights of the openings OP1, OP2, and OP3 are also aligned. In particular, since the height difference between the intermediate tank bottom plate 31 and the inner tank bottom plate 41 is filled by interposition of the lowermost intermediate tank side plate piece 32P1 for height adjustment, the second opening OP2 and the third opening OP3 can be opened without a step. Formation of these openings OP1, OP2, and OP3 makes it possible to secure a construction opening that can secure a work traffic line extending horizontally and linearly in the radial direction of the triple shell tank 1. Note that the sealing work of the first opening OP1, the second opening OP2, and the third opening OP3 is a work of fitting the side plate pieces 22P1, 22P2, 32P2, and 42P1 previously removed into the respective openings and fixing them by welding or the like.

[Placement of Anchor Strap]

Figure 5:
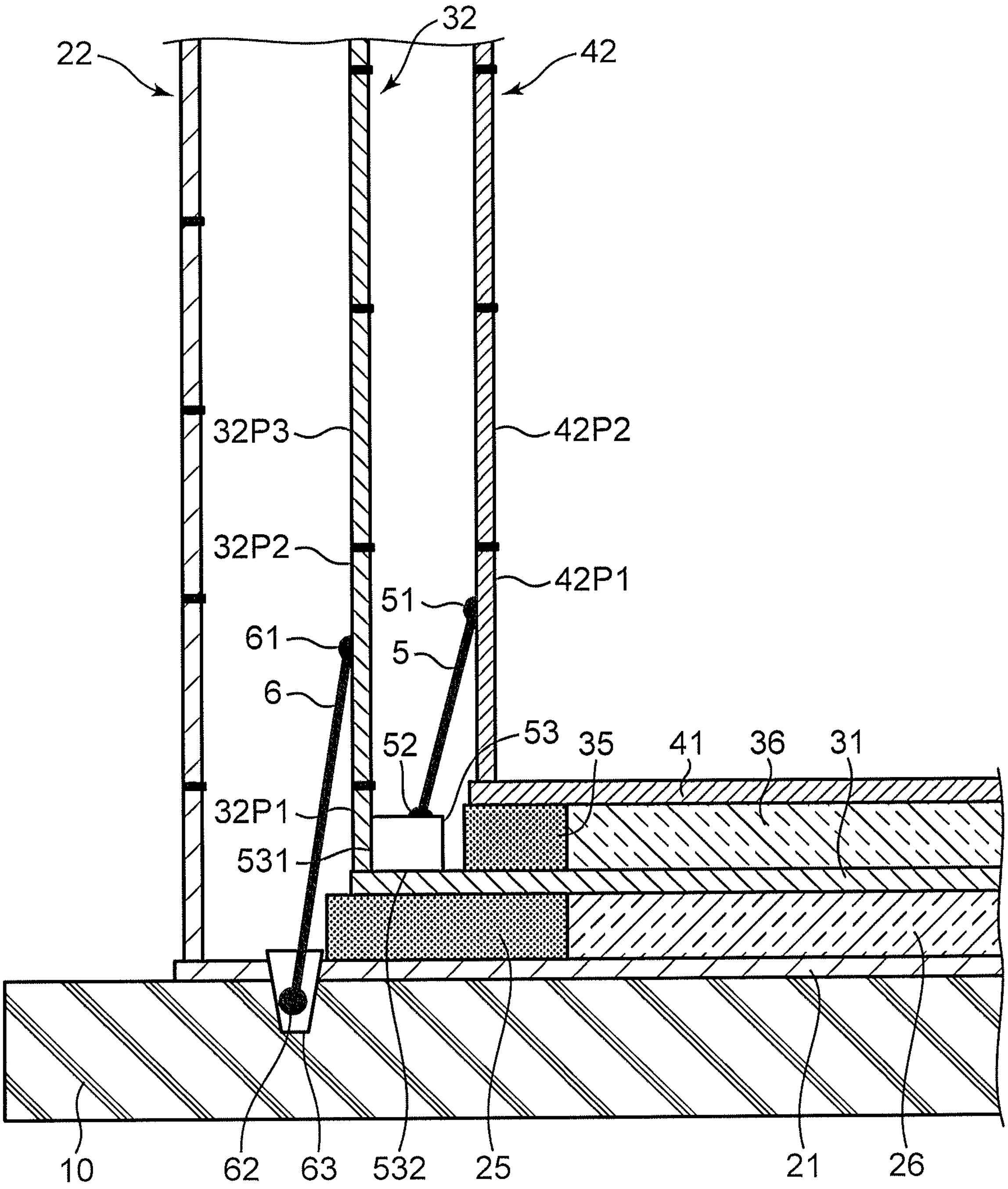
FIG. 5 is a cross-sectional view illustrating a placement state of an inner tank anchor strap and an intermediate tank anchor strap.

Subsequently, an example in which an anchor strap is placed on each of the intermediate tank side plate 32 and the inner tank side plate 42 in order to reinforce these side plates 32 and 42 will be described. FIG. 5 is a cross-sectional view illustrating a state in which the triple shell tank 1 illustrated in FIG. 2 or 4 is provided with an inner tank anchor strap 5 and an intermediate tank anchor strap 6.

The inner tank anchor strap 5 has an upper end 51 (one end) connected to the inner tank side plate 42 and a lower end 52 (other end) connected to the intermediate tank side plate 32 and the intermediate tank bottom plate 31. The intermediate tank anchor strap 6 has an upper end 61 (one end) connected to the intermediate tank side plate 32 and a lower end 62 (other end) fixed to the tank base 10. The inner tank anchor straps 5 and the intermediate tank anchor straps 6 are arranged such that about 5 to 6 of them are arranged in the circumferential direction for one side plate piece 22P and one side plate piece 32P. Placement of the anchor straps 5 and 6 can improve the strength and earthquake resistance of the intermediate tank side plate 32 and the inner tank side plate 42.

More specifically, the upper end 51 of the inner tank anchor strap 5 is connected to the inner tank side plate piece 42P1 constituting the lowermost step of the inner tank side plate 42. The upper end 51 is attached to the inner tank side plate piece 42P1 so as to be relatively slidable to some extent. This is to allow expansion and contraction and swinging of the inner tank 4 to some extent. On the other hand, the lower end 52 is fixed to a bracket 53 made of a rectangular plate. A side end edge 531 of the bracket 53 is welded to the inner peripheral surface of the intermediate tank side plate piece 32P1 for height adjustment constituting the lowermost step of the intermediate tank side plate 32. A lower end edge 532 of the bracket 53 is welded to the intermediate tank bottom plate 31.

When a construction opening such as the above-described second opening OP2 is opened in the intermediate tank side plate 32, the intermediate tank side plate piece 32P1 is not temporarily removed. Therefore, placement of the bracket 53, that is, the inner tank anchor strap 5 is not hindered. Note that regarding the inner tank side plate piece 42P1 removed for opening the third opening OP3, the bracket 53 attached with a part that is half the inner tank anchor strap 5 in length is welded to the intermediate tank side plate piece 32P1. Then, when the inner tank side plate piece 42P1 is fitted into the third opening OP3, a part that is the remaining half in length is added to complete the inner tank anchor strap 5. Note that since the length of the inner tank anchor strap 5 is set corresponding to the allowable displacement amount of the inner tank 4 or the like, the upper end 51 of the inner tank anchor strap 5 may be attached to the inner tank side plate piece 42P2 constituting the second circular step.

The upper end 61 of the intermediate tank anchor strap 6 is connected to the intermediate tank side plate piece 32P2 constituting the circular step of the second circular step from the bottom of the intermediate tank side plate 32. The upper end 61 is attached to the intermediate tank side plate piece 32P2 so as to be relatively slidable to some extent. The lower end 62 is fixed to an anchor box 63 embedded in the tank base 10 (base structure). Attachment of the intermediate tank anchor strap 6 to the intermediate tank side plate piece 32P2 temporarily removed for opening the second opening OP2 is the same as in the case of the inner tank anchor strap 5 described above. The length of the intermediate tank anchor strap 6 is also set corresponding to the allowable displacement amount of the intermediate tank 3 or the like. Therefore, the upper end 61 may be attached to the intermediate tank side plate pieces 32P1 and 32P3 constituting the lowermost circular step or the third circular step.

According to the triple shell tank 1 according to the present disclosure described above, the outer tank side plate 22, the intermediate tank side plate 32, and the inner tank side plate 42 are installed by stacking circular steps formed by arranging the side plate pieces 22P, 32P, and 42P in a circular ring shape. The intermediate tank side plate piece 32P1 for height adjustment constituting the lowermost step of the intermediate tank side plate 32 has a height size that fills the height difference between the inner tank bottom plate 41 and the intermediate tank bottom plate 31. Accordingly, the intermediate tank side plate piece 32P2 constituting the second circular step of the intermediate tank side plate 32 and the inner tank side plate piece 42P1 constituting the lowermost circular step of the inner tank side plate 42 can be disposed at the same height position. Therefore, when the opening for construction is opened in the intermediate tank side plate 32 and the inner tank side plate 42, if the intermediate tank side plate piece 32P2 and the inner tank side plate piece 42P1 present at positions overlapping in the circumferential direction are removed, the second opening OP2 and the third opening OP3 having no step or a negligibly small step can be opened.

If the intermediate tank side plate piece 32P1 of the lowermost step of the intermediate tank side plate 32 is set not to be removed when the second opening OP2 is opened, the intermediate tank side plate piece 32P1 can be utilized for fixing the lower end 52 of the inner tank anchor strap 5. Accordingly, it is possible to achieve improvement of the efficiency of placement work of the inner tank anchor strap 5.

SUMMARY OF PRESENT DISCLOSURE

The specific embodiments described above include a disclosure having the following configurations.

A triple shell tank according to the present disclosure is a triple shell tank including: an inner tank; an intermediate tank covering the inner tank; and an outer tank covering the intermediate tank, in which the inner tank includes an inner tank side plate assembled by stacking a plurality of circular steps formed by arranging a plurality of inner tank side plate pieces in a circular ring shape, an inner tank roof, and an inner tank bottom plate, the intermediate tank includes an intermediate tank side plate assembled by stacking a plurality of circular steps formed by arranging a plurality of intermediate tank side plate pieces in a circular ring shape, an intermediate tank roof, and an intermediate tank bottom plate, and the circular steps of the intermediate tank side plate include a lowermost step formed of an intermediate tank side plate piece for height adjustment having a height corresponding to a height difference between the inner tank bottom plate and the intermediate tank bottom plate, and a second step on the lowermost step formed of an intermediate tank side plate piece arranged at a same height position as an inner tank side plate piece of a lowermost step in the circular steps of the inner tank side plate.

According to this triple shell tank, the intermediate tank side plate and the inner tank side plate are assembled by stacking circular steps formed by arranging the inner tank side plate pieces and the intermediate tank side plate pieces, respectively, in a circular ring shape. The intermediate tank side plate piece for height adjustment constituting the lowermost step of the intermediate tank side plate has a height size corresponding to the height difference between the inner tank bottom plate and the intermediate tank bottom plate. Accordingly, the intermediate tank side plate piece constituting the second circular step of the intermediate tank side plate and the inner tank side plate piece constituting the lowermost circular step of the inner tank side plate can be disposed at the same height position. An opening for construction may be opened in the intermediate tank side plate and the inner tank side plate. In this case, if the intermediate tank side plate piece and the inner tank side plate piece present at positions overlapping in the circumferential direction are removed, a construction opening having no step or a negligibly small step can be opened.

The triple shell tank may further include an inner tank anchor strap having one end connected to the inner tank side plate and another end connected to the lowermost intermediate tank side plate piece.

According to this triple shell tank, the inner tank anchor strap can be placed by using the intermediate tank side plate piece for height adjustment described above. The construction opening can be opened in the intermediate tank side plate without removing the lowermost intermediate tank side plate piece for height adjustment. That is, since it is not necessary to consider removal of the intermediate tank side plate piece for height adjustment, it is possible to achieve improvement of the efficiency of placement work of the inner tank anchor strap.

The triple shell tank may further include an intermediate tank anchor strap having one end connected to the intermediate tank side plate piece of the second step and another end connected to a base structure of the triple shell tank.

According to this triple shell tank, the strength of the intermediate tank side plate can be reinforced by the intermediate tank anchor strap.

The invention claimed is:

1. A triple shell tank comprising:

an inner tank; an intermediate tank covering the inner tank; and an outer tank covering the intermediate tank, wherein the inner tank includes an inner tank side plate, an inner tank roof, and an inner tank bottom plate, the inner tank side plate being assembled by stacking a plurality of circular steps formed by arranging a plurality of inner tank side plate pieces in a circular ring shape, the intermediate tank includes an intermediate tank side plate, an intermediate tank roof, and an intermediate tank bottom plate, the intermediate tank side plate being assembled by stacking a plurality of circular steps formed by arranging a plurality of intermediate tank side plate pieces in a circular ring shape, and the circular steps of the intermediate tank side plate include a lowermost step formed of an intermediate tank side plate piece for height adjustment having a height corresponding to a height difference between the inner tank bottom plate and the intermediate tank bottom plate, and a second step on the lowermost step formed of an intermediate tank side plate piece arranged at a same height position as an inner tank side plate piece of a lowermost step in the circular steps of the inner tank side plate.

2. The triple shell tank according to claim 1, further comprising an inner tank anchor strap having one end connected to the inner tank side plate and another end connected to the lowermost intermediate tank side plate piece.

3. The triple shell tank according to claim 1, further comprising an intermediate tank anchor strap having one end connected to the intermediate tank side plate piece in the second step and another end connected to a base structure of the triple shell tank.

4. The triple shell tank according to claim 2, further comprising an intermediate tank anchor strap having one end connected to the intermediate tank side plate piece in the second step and another end connected to a base structure of the triple shell tank.

* * * * *